United States Patent [19]
Kano et al.

[11] Patent Number: 5,909,115
[45] Date of Patent: Jun. 1, 1999

[54] POSITION DETECTING APPARATUS EMPLOYING MAGNETORESISTANCE EFFECT ELEMENTS CONNECTED IN SERIES

[75] Inventors: Hiroshi Kano, Kanagawa; Masaaki Kusumi, Tokyo, both of Japan

[73] Assignees: Sony Corporation; Sony Magnescale Inc., both of Tokyo, Japan

[21] Appl. No.: 08/843,788

[22] Filed: Apr. 21, 1997

Related U.S. Application Data

[63] Continuation of application No. 08/546,597, Oct. 23, 1995, abandoned.

[30] Foreign Application Priority Data

Oct. 25, 1994 [JP] Japan .................................. 6-260548

[51] Int. Cl.$^6$ ............................ G01B 7/14; G01D 5/245; G01R 33/09
[52] U.S. Cl. ............................. 324/207.21; 324/207.12; 324/207.25
[58] Field of Search ............................. 324/207.21, 207.2, 324/207.12, 207.24, 207.25, 251, 252; 338/32 H, 32 R; 327/510, 511

[56] References Cited

U.S. PATENT DOCUMENTS

| | | | |
|---|---|---|---|
| 4,594,548 | 6/1986 | Takahashi et al. | 324/207.21 |
| 4,639,807 | 1/1987 | Sekizawa et al. | 360/113 |
| 5,243,280 | 9/1993 | Kusumi | 324/207.21 |
| 5,301,079 | 4/1994 | Cain et al. | 360/113 |
| 5,351,027 | 9/1994 | Kawamata et al. | 338/32 R |
| 5,422,571 | 6/1995 | Gurney et al. | 324/252 |
| 5,453,684 | 9/1995 | Nakayama | 324/207.12 |
| 5,500,590 | 3/1996 | Pant | 324/252 |
| 5,563,752 | 10/1996 | Komuro et al. | 360/113 |
| 5,619,132 | 4/1997 | Spies | 324/207.21 |

*Primary Examiner*—Walter E. Snow
*Attorney, Agent, or Firm*—Jay H. Maioli

[57] ABSTRACT

A position detecting apparatus can detect a position with high accuracy even when a relative angle between a magnetic recording medium and a magnetic detecting portion is fluctuated, when an angle of the magnetic recording medium is partly fluctuated or even when an ambient temperature and a temperature of the magnetic detecting portion are fluctuated. The position detecting apparatus includes a magnetic recording medium (1) in which magnetic information is recorded and a magnetic detecting portion (2) movable relative to the magnetic recording medium (1) and which detects the magnetic information recorded on the magnetic recording medium (1). The magnetic detecting portion (2) includes a plurality of, for example, m magnetoresistance effect elements (3) with an artificial grid film structure wherein conductive layers (3a) and magnetic layers (3b) are alternately laminated. The magnetoresistance effect elements ($3_1, 3_2, \ldots, 3_m$) are disposed at a predetermined pitch with respect to the relative moving direction of the magnetic recording medium. The magnetoresistance effect elements ($3_1, 3_2, \ldots, 3_m$) are connected in series so as to function as a single magnetic variable resistor (4). The direction of a current flowing in the magnetoresistance effect elements ($3_1, 3_2, \ldots, 3_m$) relative to the recording longitudinal direction of the magnetic information recorded on the magnetic recording medium (1) have angles other than a right angle.

9 Claims, 8 Drawing Sheets

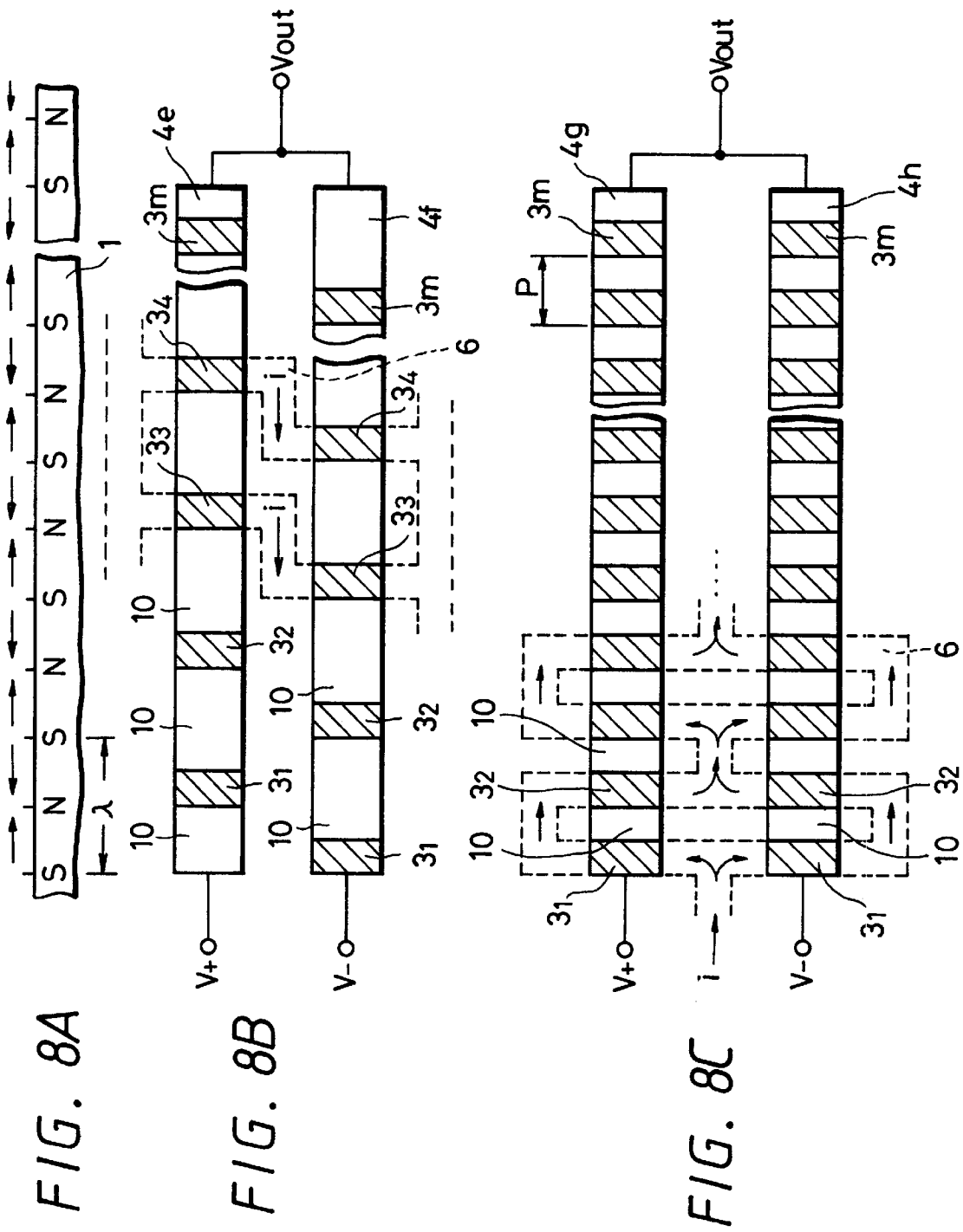

POSITION DETECTING APPARATUS EMPLOYING MAGNETORESISTANCE EFFECT ELEMENTS CONNECTED IN SERIES

This is a continuation of application Ser. No. 08/546,597 filed Oct. 23, 1995, now abandoned.

BACKGROUND OF THE INVENTION

The present invention relates to a position detecting apparatus for use with a magnetic scale and a rotary encoder applicable to machine tools, industrial machines, precision type measuring/angle measuring apparatus or the like, for example.

Magnetoresistance effect elements (often referred to as "MR elements") made of a thin film such as Fe—Ni (permalloy) or Ni—Co exhibiting a magnetoresistance effect are generally used as a magnetic detecting portion of a position detecting apparatus, such as a magnetic scale or rotary encoder applicable to machine tools, industrial machines and precision type measuring/angle measuring apparatus.

Shapes and structures of magnetic scales and rotary encoders with magnetic detecting portions composed of MR elements are changed variously depending on the purpose and manner in which they are used. Fundamentally, magnetic scales and rotary encoders with high accuracy and high resolution can realize high precision and high resolution by reducing the magnetic recording pitch (recording wavelength) or reducing the error produced per wavelength when they are inserted into position detecting apparatus by reducing a harmonic distortion of a waveform or improving a signal-to-noise ratio (S/N).

The above magnetic detecting portion generally comprises thin film elements formed on a glass or silicon base. Magnetic scales and rotary encoders with high precision and high resolution using such a magnetic detecting portion hold a magnetic recording scale surface and a MR element surface serving as a detecting surface at a constant spacing parallel to each other such that the two surfaces can be relatively moved in an opposing relation in order to reduce the recording wavelength.

A waveform of an output from the magnetic detecting portion contains a harmonic distortion due to mainly a saturation characteristic of the magnetoresistance effect in the MR element. A pattern layout of the MR element is closely studied in order to lessen the harmonic distortion. In general, the MR element has a pattern layout of a so-called spatial filter type in order to reduce a specific harmonic distortion component.

The position detecting apparatus such as the magnetic scale and rotary encoder can detect a moving amount and a moving direction based on two sine wave signals having a phase difference of 90 degrees output from the magnetic detecting portion. The position detecting apparatus arranged such that the magnetic recording surface and the detection surface of the magnetic detecting portion are relatively moved with a constant spacing therebetween in parallel to each other encounters the following problems:

Specifically, when a clearance between the scale surface and the detection surface of the magnetic detecting portion or spacing between the scale surface and a magnetic detecting portion holding mechanism is smudged by foreign substances such as dusts or chips or the original scale surface is curved or wobbles, such clearance or spacing is widened or relative angles (pitch, yaw, azimuth) are fluctuated. Therefore, levels of output signals or DC components are fluctuated and the detection accuracy of the position detecting apparatus is often degraded.

When a magnetic scale has a fluctuation of a magnetic characteristic of a magnetic material forming a magnetic recording medium constructing the magnetic scale or a deviation of a material, output signals are similarly fluctuated and the detection accuracy becomes degraded.

When the relative angle is fluctuated, the magnetic characteristics of the magnetic material are fluctuated or when the material is not well-balanced, amplitudes of the two sine wave signals with a phase difference of 90 degrees are separately changed in the position detecting apparatus using MR sensors, which mainly causes the detection accuracy to be degraded.

When the relative angles (pitch, yaw, azimuth) between the surface of the magnetic recording medium and the detecting surface of the magnetic detecting portion is fluctuated, effects achieved by the pattern layout reducing the harmonic distortion is deteriorated, which leads to the deterioration of the detection accuracy.

Furthermore, the magnetoresistance effect element is the resistor and therefore generates heat by application of a current so that the temperature of the magnetoresistance effect element increases. Increasing temperatures of the respective magnetoresistance effect elements are changed depending on the pattern layouts. As a result, the resistance values and the changing ratios of the magnetoresistance effect elements are fluctuated depending on the temperature characteristics of the magnetoresistance effect elements to cause a drift of an output voltage and a fluctuation of amplitude, resulting in the detection accuracy being degraded.

SUMMARY OF THE INVENTION

In view of the aforesaid aspect, it is an object of the present invention to provide a position detecting apparatus which can detect a position with high accuracy even when a relative angle between a magnetic recording medium and a magnetic detecting portion is fluctuated, when a recorded state of the magnetic recording medium is partly fluctuated or even when an ambient temperature and a temperature of the magnetic detecting portion are fluctuated.

According to an aspect of the present invention, there is provided a position detecting apparatus which is comprised of a magnetic recording medium in which magnetic information is recorded and a magnetic detecting portion movable relatively to the magnetic recording medium and able to detect the magnetic information recorded on the magnetic recording medium, wherein the magnetic detecting portion includes a plurality of magnetic variable resistors which are disposed in parallel to each other, each of the magnetic variable resistors has an artificial grid film structure wherein conductive layers and magnetic layers are alternately laminated and has a plurality of magnetoresistance effect elements spaced apart from one another by a predetermined pitch in a relative moving direction, and the magnetoresistance effect elements of the magnetic variable resistors are displaced from magnetoresistance effect elements of other magnetic variable resistors by a predetermined phase difference in the relative moving direction.

According to another aspect of the present invention, there is provided a position detecting apparatus which is comprised of a magnetic recording medium in which magnetic information is recorded and a magnetic detecting portion movable relative to the magnetic recording medium and able to detect the magnetic information recorded on the magnetic recording medium, wherein the magnetic detecting portion includes a plurality of magnetic variable resistors which are disposed in parallel to each other, each of the magnetic variable resistors has an artificial grid film structure wherein conductive layers and magnetic layers are alternately laminated and has a plurality of magnetoresistance effect elements spaced apart from one another by a predetermined pitch in a relative moving direction, and a direction of a current flowing in the magnetoresistance effect elements and a longitudinal direction of magnetic information recorded on the magnetic recording medium have angle components other than a right angle.

BRIEF DESCRIPTION OF THE DRAWINGS

FIGS. 8A, 8B and 8C are diagrams used to explain another magnetic detecting portion;

DETAILED DESCRIPTION OF THE PREFERRED EMBODIMENTS

A position detecting apparatus according to the present invention will now be described with reference to the drawings.

Figure 1:
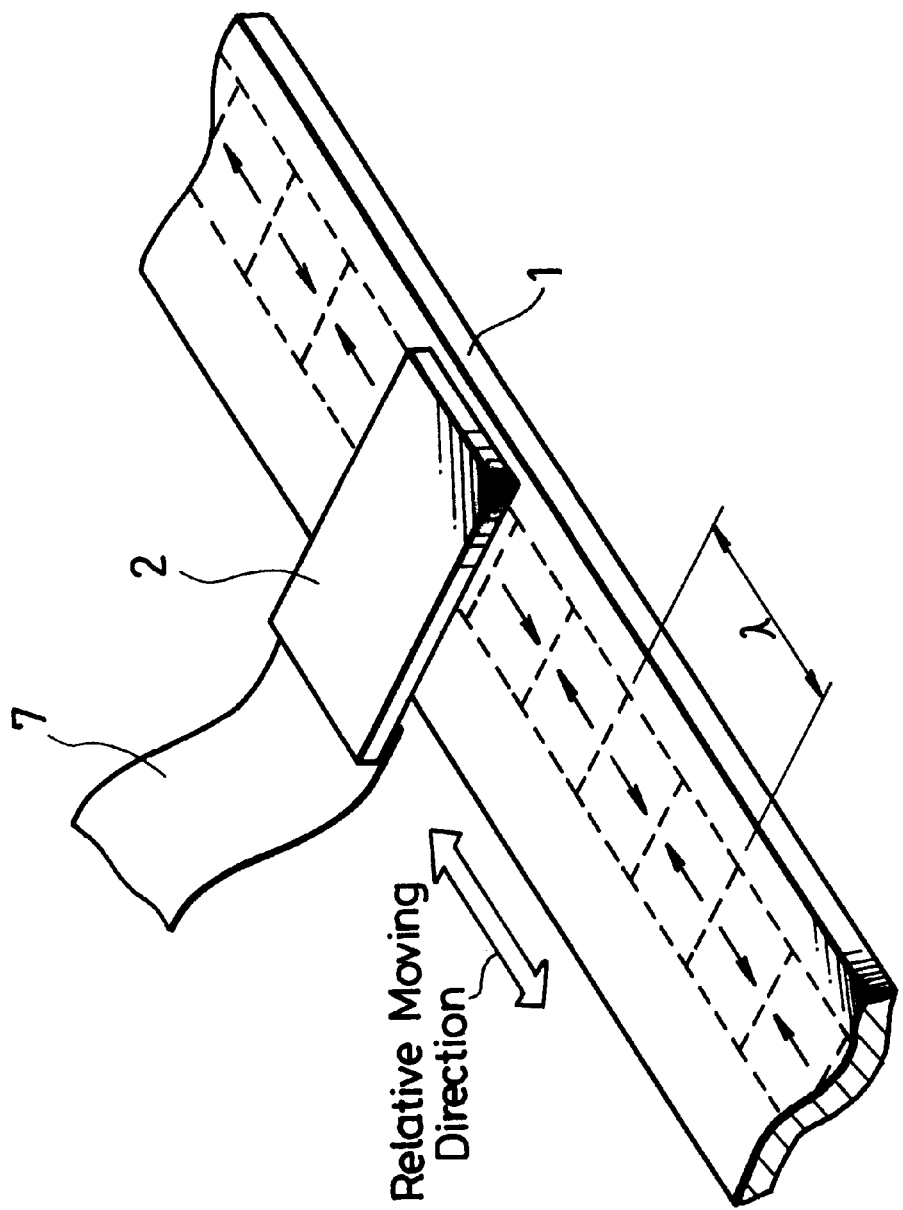
FIG. 1 is a perspective view, partly in a cut-away form, illustrating an example of a position detecting apparatus.

FIG. 1 of the accompanying drawings shows an example of a position detecting apparatus. A magnetic recording medium, generally depicted at reference numeral 1 in FIG. 1, is a magnetic scale, for example, wherein a magnetic material with a thickness of 2 to 3 $\mu$m is formed on the surface of a glass base of a flat rectangular configuration in cross section by electroless plating. Scales are recorded on this magnetic recording medium 1 by an ordinary magnetic head at a constant wavelength $\lambda$, e.g., 40 $\mu$m in the longitudinal direction.

A magnetic detecting portion 2 formed of a detecting head, for example, can be moved in the longitudinal direction of the magnetic recording medium 1. A holding mechanism (not shown) holds the magnetic detecting portion 2 such that the detecting surface of the magnetic detecting portion 2 changes in the longitudinal direction of the magnetic recording medium 1 with a constant spacing kept between it and the magnetic recording medium 1.

Figure 2:
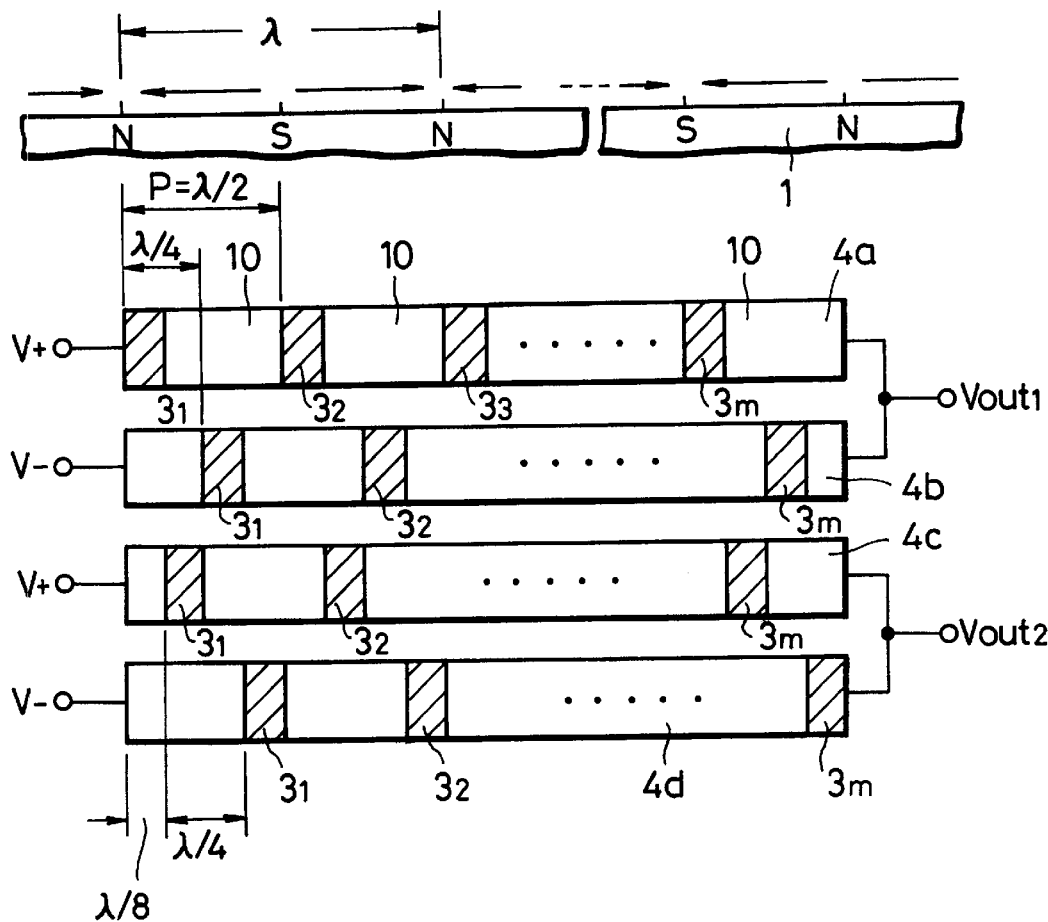
FIG. 2 is a plan view showing a magnetic detecting portion used in the position detecting apparatus.
Figure 3:
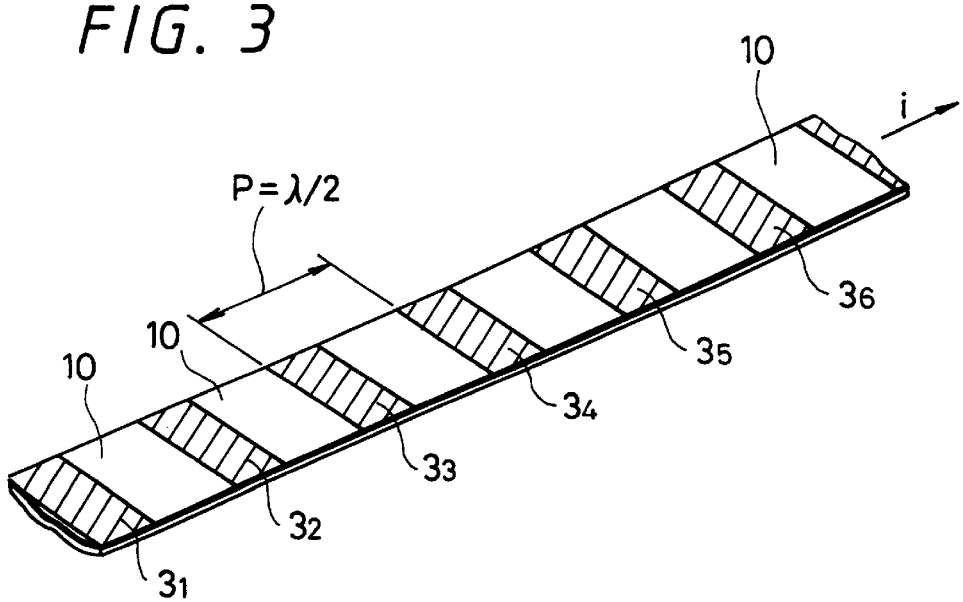
FIG. 3 is a perspective view, partly in a cut-away form, illustrating a magnetic detecting portion used in the position detecting apparatus.

The magnetic detecting portion 2 is arranged as shown in FIGS. 2 and 3. FIG. 2 is a plan view illustrating the magnetic detecting portion 2 according to the present invention. As shown in FIG. 2, the magnetic detecting portion 2 comprises four parallel magnetic variable resistors 4a, 4b, 4c, 4d formed on an insulating substrate composed of a glass or aluminum base and an insulating layer formed on the glass or aluminum base in the longitudinal direction of the magnetic recording medium 1.

Figure 7:
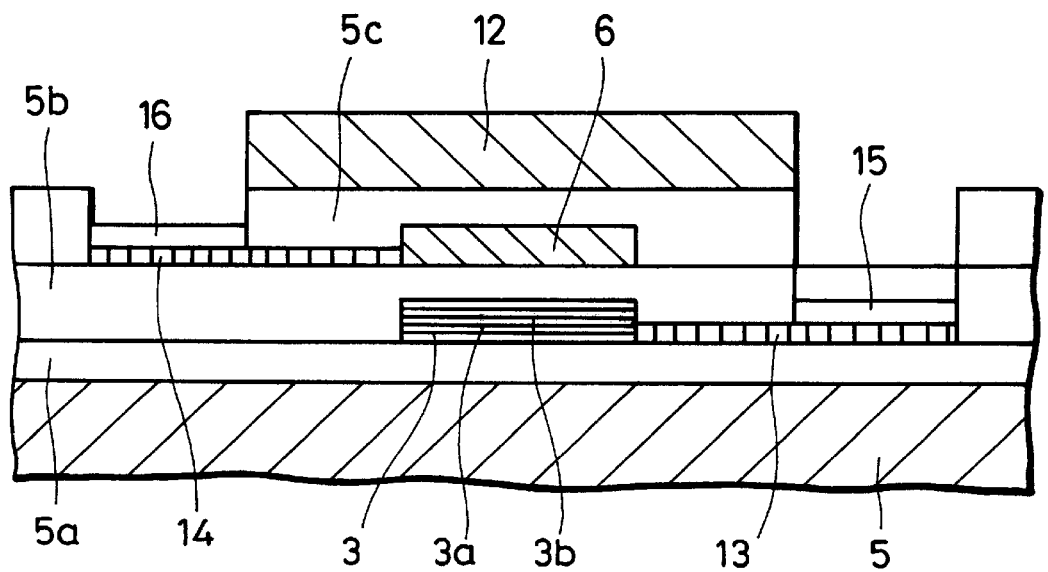
FIG. 7 is a cross-sectional view illustrating a main portion of another magnetic detecting portion.

As shown in FIGS. 3 and 7, each of the magnetic variable resistors 4a, 4b, 4c, 4d comprises a plurality of, e.g., m magnetoresistance effect elements 3 having an artificial grid film structure with conductive layers 3a and magnetic layers 3b alternately laminated thereon. The m magnetoresistance effect elements $3_1, 3_2, \ldots, 3_m$ are disposed in the longitudinal direction of the magnetic recording medium 1 at a pitch P expressed as:

P=($\lambda$/2)n (n is a natural number)

FIG. 3 shows the magnetic detecting portion 2 wherein the magnetoresistance effect elements $3_1, 3_2, \ldots, 3_m$ are disposed at a pitch P=($\lambda$/2) where n=1. Connection conductors 10 are disposed between the adjacent magnetoresistance effect elements $3_1, 3_2, \ldots, 3_m$. Each of the magnetic variable resistors 4a, 4b, 4c, 4d serves as a single magnetic variable resistor.

Each of the magnetoresistance effect elements $3_1, 3_2, \ldots, 3_m$ is formed by alternately laminating a 1 nm-thick CoFeNi magnetic alloy as the magnetic layer 3b and a 2.2 nm-thick Cu layer as the conductive layer 3a by twenty layers each. A protecting film is formed on each of the magnetoresistance effect elements $3_1, 3_2, \ldots, 3_m$ by photoresist. The pattern of the artificial grid film layer is formed by photolithography.

The width of each of the magnetic detecting sensors 4a, 4b, 4c, 4d is 20 $\mu$m and the spacing between adjacent ones of the magnetic sensors 4a, 4b, 4c, 4d is 5 $\mu$m. The dimension of the four magnetic variable resistors 4a, 4b, 4c, 4d becomes as small as 95 $\mu$m in total.

Figure 4:
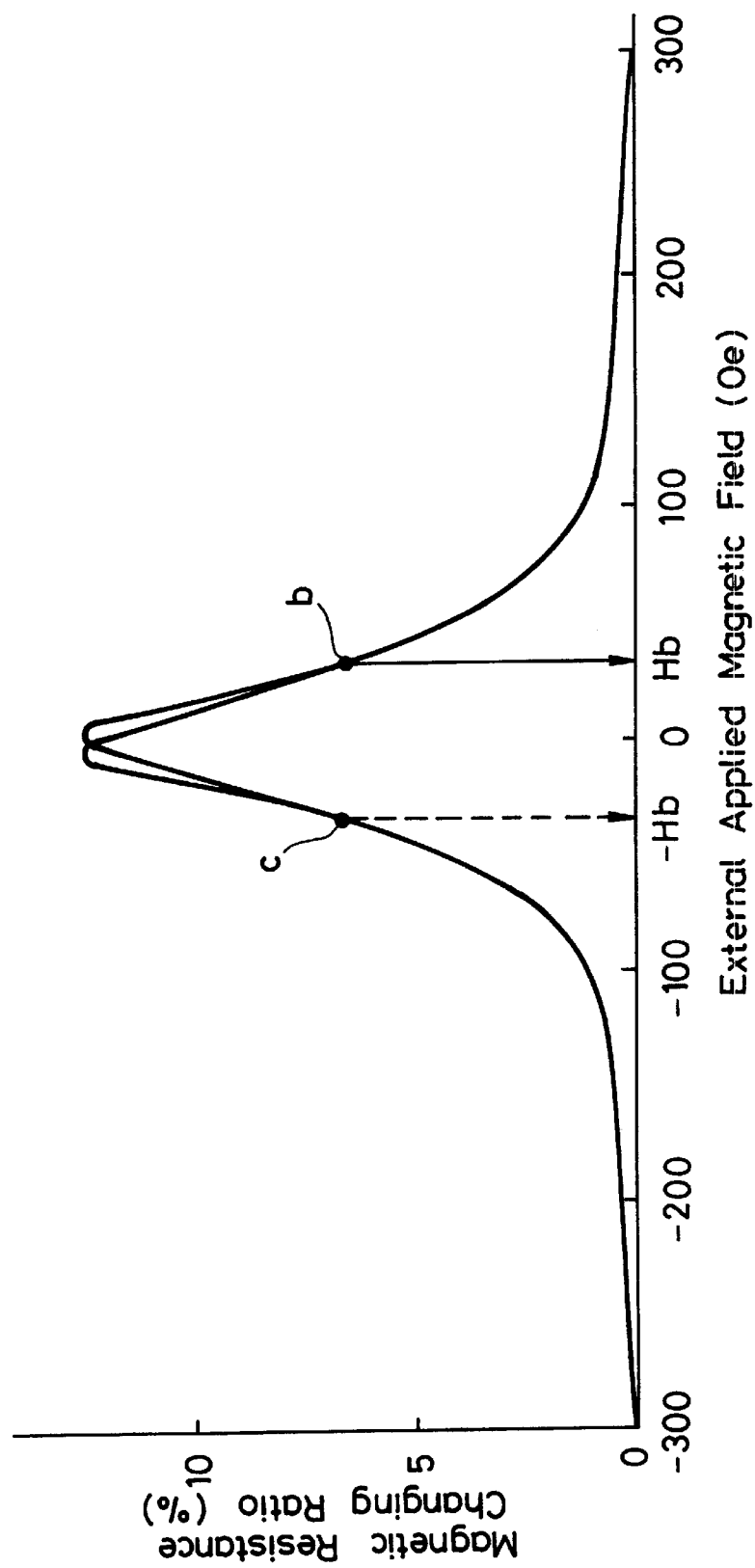
FIG. 4 is a characteristic graph showing measured results of external applied magnetic field versus magnetoresistance changing ratio characteristics.

FIG. 4 is a characteristic graph showing measured results of an external applied magnetic field versus magnetoresistance changing ratio characteristics with respect to the magnetoresistance effect elements $3_1, 3_2, \ldots, 3_m$ of the artificial grid film structure with the conductor layers 3a and the magnetic layers 3b alternately laminated thereon. Study of FIG. 4 reveals that the magnetoresistance changing ratio is considerably large as shown by the curves.

The resistance value of the magnetoresistance effect elements $3_1, 3_2, \ldots, 3_m$ is determined only by a magnitude of a magnetic field applied to the film surface. Hence, a current direction and a easy magnetization axis direction can be set freely.

Therefore, the magnetoresistance effect elements $3_1, 3_2, \ldots, 3_3$ can vary the resistance value even when the current direction is set to the longitudinal direction of the magnetic recording medium 1 and the easy magnetization axis direction is set to the direction at a right angle of the easy magnetization axis direction.

The magnetization easy axis direction may be set to the direction parallel to the current direction. Moreover, although an isotropic film without uniaxial magnetic anisotropy may be used, if the magnetoresistance effect elements $3_1, 3_2, \ldots, 3_m$ are disposed such that a magnetic field is applied to the direction perpendicular to the magnetization easy axis direction, then it is possible to maintain an area with a more satisfactory linearity. Having compared the isotropic film and the anisotropic film with each other, it is to be understood that the latter can provide the magnetoresistance effect elements with a more excellent sensitivity.

The magnetoresistance effect elements $3_1, 3_2, \ldots, 3_m$ of the magnetic variable resistor $4b$ are displaced from the magnetoresistance effect elements $3_1, 3_2, \ldots, 3_m$ of the magnetic variable resistor $4a$ in the longitudinal direction of the magnetic recording medium 1 by $(n\pm\frac{1}{4})\lambda$ (n is an integer). The magnetoresistance effect elements $3_1, 3_2, \ldots, 3_m$ of the magnetic variable resistor $4c$ are displaced from the magnetoresistance effect elements $3_1, 3_2, \ldots, 3_m$ of the magnetic variable resistor $4a$ in the longitudinal direction of the magnetic recording medium 1 by $(n\pm\frac{1}{8})\lambda$ (n is an integer).

The magnetoresistance effect elements $3_1, 3_2, \ldots, 3_m$ of the magnetic variable resistor $4d$ are displaced from the magnetoresistance effect elements $3_1, 3_2, \ldots, 3_m$ of the magnetic variable resistor $4c$ in the longitudinal direction of the magnetic recording medium 1 by $(n\pm\frac{1}{4})\lambda$ (n is an integer).

A predetermined positive voltage $V_+$ is supplied to one end of the magnetic variable resistors $4a, 4c$ and a predetermined negative voltage $V_-$ is supplied to one end of the magnetic variable resistors $4b, 4d$, respectively. A current in the same direction as the longitudinal direction of the magnetic recording medium 1 flows in the magnetic variable resistors $4a, 4b, 4c, 4d$.

The other ends of the magnetic variable resistors $4a, 4b$ are connected to each other and a detection terminal $V_{out1}$ is led out from a junction between the other ends of the magnetic variable resistors $4a, 4b$. The other ends of the magnetic variable resistors $4c, 4d$ are connected to each other and another detection terminal $V_{out2}$ is led out from a junction between the other ends of the magnetic variable resistors $4c, 4d$.

Figure 5:
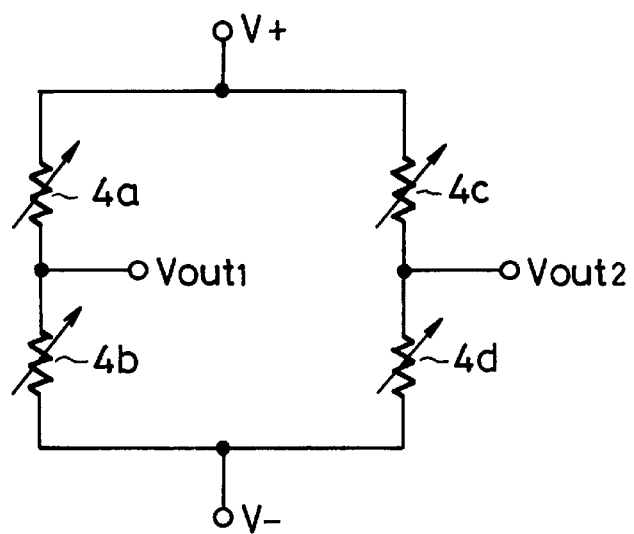
FIG. 5 is a diagram showing an equivalent circuit of a magnetic detecting portion.

FIG. 5 is a diagram showing an equivalent circuit of the magnetic detecting portion 2. As shown in FIG. 5, the equivalent circuit of the magnetic detecting portion 2 is of the bridge arrangement wherein a series circuit of the magnetic variable resistors $4a, 4b$ and a series circuit of the magnetic variable resistors $4c, 4d$ are connected in parallel to each other and the detection terminals $V_{out1}, V_{out2}$ are led out from the junction between the magnetic variable resistors $4a$ and $4b$ and the junction between the magnetic variable resistors $4c$ and $4d$. In FIG. 1, reference numeral 7 depicts a flexible printed circuit board for supplying a predetermined operation voltage to the magnetic detecting portion 2 and which generates a detection voltage signal.

According to the present invention, since a plurality of, e.g., m highly-sensitive magnetoresistance effect elements with the artificial grid film structure formed by alternately laminating the conductive layers $3a$ and the magnetic layers $3b$ are disposed in the relative moving direction of the magnetic recording medium 1 at a pitch of $\lambda/2$ and a plurality of magnetoresistance effect elements $3_1, 3_2, \ldots, 3_m$ are connected in series to provide each of the magnetic variable resistors $4a, 4b, 4c, 4d$, even when an angle of the magnetic variable resistors $4a, 4b, 4c, 4d$ relative to the magnetic recording medium 1 is fluctuated, when the recorded state of the magnetic recording medium 1 is fluctuated partly or even when an ambient temperature or temperatures of the magnetic variable resistors $4a, 4b, 4c, 4d$ are fluctuated, detected signals of the magnetoresistance elements $3_1, 3_2, \ldots, 3_m$ are added and thereby the magnetic variable resistors $4a, 4b, 4c, 4d$ can be protected from being degraded in detection accuracy.

When the magnetic detecting portion 2 is moved relatively to the magnetic recording medium 1, resistance values of the magnetic variable resistors $4a, 4b, 4c, 4d$ are changed as shown in FIGS. 6A, 6B, 6C, 6D. As illustrated, phase differences between the changes of the resistance values of the magnetic variable resistors $4a, 4b$ and $4c, 4d$ are 180 degrees, respectively, with the result that detection voltage signals with a phase difference of 90 degrees therebetween are developed at the detection output terminals $V_{out1}$ and $V_{out2}$ as shown in FIGS. 6E and 6F. It is possible to measure a relative moving distance between the magnetic recording medium 1 and the magnetic detecting portion 2 by use of the detection voltage signals.

Further, according to the present invention, since the four magnetic variable resistors $4a, 4b, 4c, 4d$ constructing the magnetic detecting portion 2 are disposed at substantially the same position of the magnetic recording medium 1 in the longitudinal direction in which scales are recorded, even when the magnetic recording medium 1 is mechanically fluctuated in the longitudinal direction, when the magnetic recording medium 1 is curved, when characteristics of the four magnetic variable resistors $4a, 4b, 4c, 4d$ are not uniform or even when a temperature distribution is fluctuated by heat, the four magnetic variable resistors $4a, 4b, 4c, 4d$ are changed in the same manner. Moreover, the width dimension of the four magnetic variable resistors $4a, 4b, 4c, 4d$ are as small as 95 $\mu$m in total, the four magnetic variable resistors $4a, 4b, 4c, 4d$ are similarly changed in the width direction when the magnetic recording medium 1 is fluctuated mechanically.

Since the four magnetic variable resistors $4a, 4b, 4c, 4d$ are changed similarly when the magnetic recording medium 1 is mechanically fluctuated in all directions, when the magnetic recording medium 1 is curved, when the characteristics of the magnetic variable resistors $4a, 4b, 4c, 4d$ are not uniform or when the temperature is fluctuated, the output signals with the phase difference of 90 degrees are changed in the same manner. Therefore, the position detecting apparatus can detect the position with high accuracy and high resolution.

Although a bias magnetic field is not applied to the magnetoresistance effect elements $3_1, 3_2, \ldots, 3_m$ with the artificial grid film structure where the conductive layers $3a$ and the magnetic layers $3b$ are alternately laminated when the magnetoresistance effect elements $3_1, 3_2, \ldots, 3_m$ are in use as described above, the present invention is not limited thereto and a bias magnetic field Hb or −Hb shown at bias point b or c in FIG. 4 may be applied to the magnetoresistance effect elements $3_1, 3_2, \ldots, 3_m$. At that time, it is possible to select a portion with excellent linearity. FIG. 7 shows a main portion of a magnetic detecting portion which applies a bias magnetic field to the magnetoresistance effect elements $3_1, 3_2, \ldots, 3_m$. In the following description, the magnetoresistance effect elements with the artificial grid film structure will be simply referred to as "GMR elements", when necessary.

As shown in FIG. 7, an $SiO_2$ insulating layer $5a$, for example, is formed on an aluminum base 5. An artificial grid multi-layer film with a predetermined pattern composed of a magnetic layer, e.g., CoFeNi magnetic alloy, e.g., $Fe_{18}CO_{10}Ni_{72}$ or $Fe_{16}Co_{20}Ni_{64}$ layer $3b$ and a conductive layer, e.g., Cu layer $3a$ is formed on the insulating layer $5a$ by a sputtering apparatus (not shown).

A thickness of the CoFeNi magnetic alloy layer $3b$ is 1 nm and a thickness of the Cu layer $3a$ is 2.2 nm. The CoFeNi magnetic alloy layer $3b$ and the Cu layer $3a$ are alternately laminated by 20 layers each, thereby the GMR element 3 with the artificial grid film structure being formed. An $SiO_2$ insulating layer $5b$ is formed on the GMR element 3. A bias pattern 6 made of a conductive film such as an Au film is formed over the GMR element 3 above the insulating layer 5b.

A protecting film 12 is formed over the bias pattern 6 above the SiO$_2$ insulating layer 5c by photoresist. The patterns of the artificial grid films 3a, 3b and the bias pattern 6 are formed by use of photolithography.

In FIG. 7, reference numeral 13 denotes a conductor for supplying a voltage to the GMR elements $3_1, 3_2, \ldots, 3_m$ and 14 a conductor for supplying the bias pattern 6 with a current. Reference numerals 15, 16 depict electrodes, respectively. In FIG. 7, a magnetic field is generated around the bias pattern 6 by flowing a predetermined bias current to the bias pattern 6. The resultant magnetic field is applied to the GMR elements 3.

A manner in which the bias magnetic field is applied to the GMR elements $3_1, 3_2, \ldots, 3_m$ of the magnetic variable resistors by the bias pattern 6 will be described with reference to FIGS. 8B and 8C. FIGS. 8B and 8C schematically illustrate the pattern of the magnetic detecting portion 2 which is formed by the above-mentioned manufacturing process so as to output a signal. The base 5, the insulating layers 5a, 5b, 5c, the protecting film 12 and the electrodes 15, 16 are not shown or very simplified in FIGS. 8B and 8C. FIGS. 8B and 8C illustrate only a single output.

As shown in FIG. 8B, a pitch P of the GMR elements $3_1, 3_2, \ldots, 3_m$ or similar magnetic variable resistors 4e, 4f are set to λn (n is a natural number). The GMR elements $3_1, 3_2, \ldots, 3_m$ of the magnetic variable resistor 4f are displaced from the GMR elements $3_1, 3_2, \ldots, 3_m$ of the magnetic variable resistor 4e by λ/2 in the longitudinal direction of the magnetic recording medium 1 (see FIG. 8A). Predetermined bias currents i which flow in the same direction interact with the GMR elements $3_1, 3_2, \ldots, 3_m$ to apply bias magnetic fields of the same direction to the GMR elements $3_1, 3_2, \ldots, 3_m$.

As shown in FIG. 8B, a positive voltage $V_+$ is supplied to an end of the magnetic variable resistor 4e and a negative voltage $V_-$ is supplied to an end of the magnetic variable resistor 4f. The other ends of the magnetic variable resistors 4e, 4f are connected to each other and an output terminal $V_{out}$ is led out from the junction between the other ends of the magnetic variable resistors 4e and 4f.

Figure 6A:
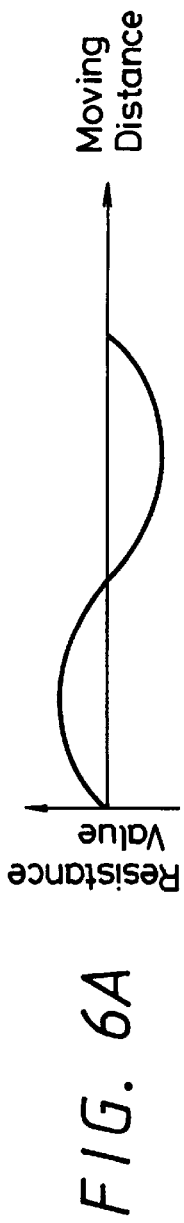
FIGS. 6A through 6F are diagrams used to explain an operation of the position detecting apparatus according to the present invention.
Figure 6B:
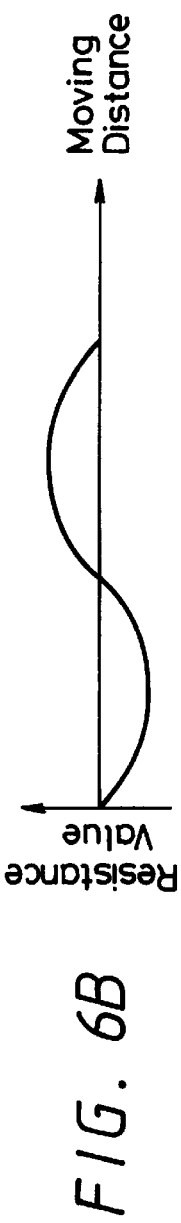
Figure 6C:
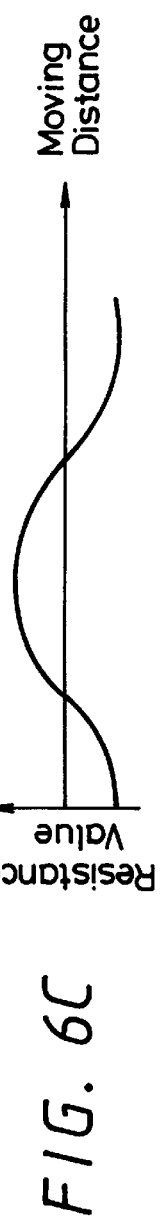
Figure 6D:
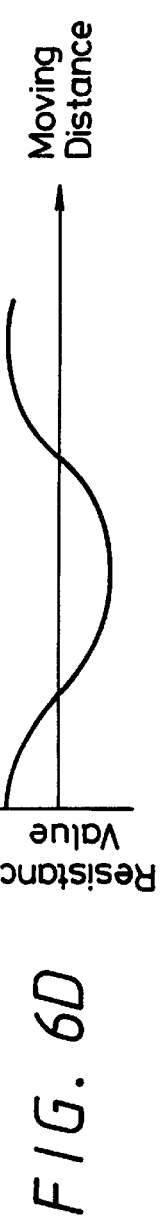
Figure 6E:
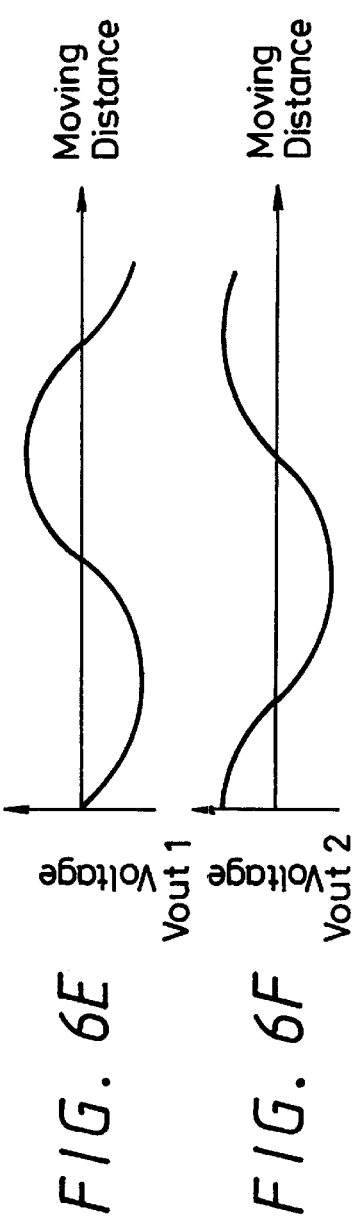
Figure 6F:
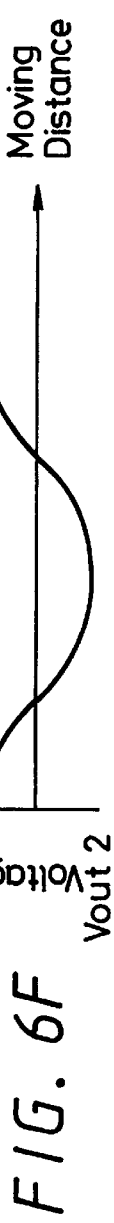

When the magnetic variable resistors 4e, 4f are relatively moved along the magnetic recording medium 1, the resistance values of the magnetic variable resistors 4e and 4f are changed as shown in FIGS. 6A and 6B. An output signal shown in FIG. 6E is developed at the output terminal $V_{out}$, accordingly.

On the other hand, as shown in FIG. 8C, the pitch P of the GMR elements $3_1, 3_2, \ldots, 3_m$ of similar magnetic variable resistors 4g, 4h is set to (λ/2)n (n is a natural number). The phases of the GMR elements $3_1, 3_2, \ldots, 3_m$ of the magnetic variable resistors 4g, 4h are made equal. Bias currents i of opposite directions interact with the GMR elements $3_1, 3_2, \ldots, 3_m$ of the magnetic variable resistors 4g, 4h. Further, bias magnetic fields of opposite directions are applied to the GMR elements $3_1, 3_2, \ldots, 3_m$ of the magnetic variable resistors 4g, 4h.

A positive voltage $V_+$ is supplied to the end of the magnetic variable resistor 4g and a negative voltage $V_-$ is supplied to the end of the magnetic variable resistor 4h. The other ends of the magnetic variable resistors 4g, 4h are connected to each other. An output terminal $V_{out}$ is led out from a junction between the other ends of the magnetic variable resistors 4g, 4h.

When the magnetic variable resistors 4g, 4h are relatively moved along the magnetic recording medium 1, the resistance values of the magnetic variable resistors 4g, 4h are changed as shown in FIGS. 6A and 6B so that the output signal shown in FIG. 6E is developed at the output terminal $V_{out}$.

The magnetic variable resistors 4g, 4h shown in FIG. 8C will be described more in detail. The GMR elements $3_1, 3_2, \ldots, 3_m$ are disposed with an equal phase at the interval of nλ (n is a natural number). Bias magnetic fields are applied to the GMR elements $3_1, 3_2, \ldots, 3_m$ constructing the magnetic variable resistor 4g from lower to upper in FIG. 8C. On the other hand, bias magnetic fields are applied to the GMR elements $3_1, 3_2, \ldots, 3_m$ constructing the magnetic variable resistor 4h in the direction opposite to that of the magnetic variable resistor 4g (from upper to lower in FIG. 8C).

Figure 9:
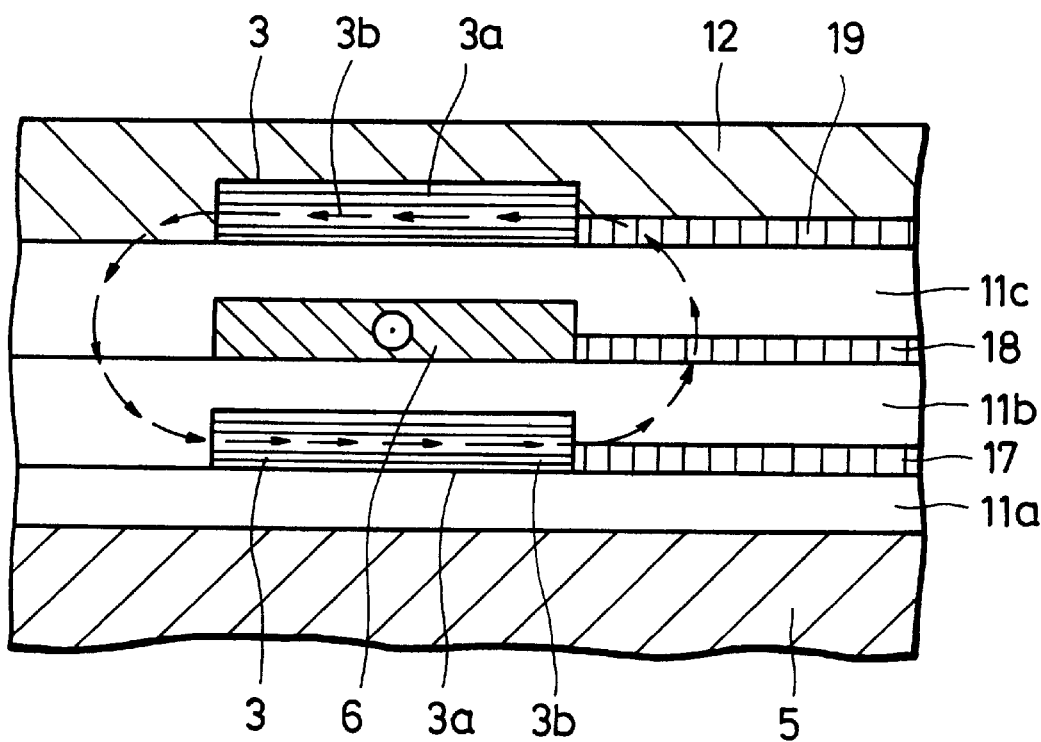
FIG. 9 is a cross-sectional view illustrating another magnetic detecting portion.

The bias magnetic fields Hb and −Hb of opposite directions may be applied to the GMR elements $3_1, 3_2, \ldots, 3_m$ of the magnetic variable resistors 4g, 4h as shown in FIG. 9.

Specifically, as shown in FIG. 9, an SiO$_2$ insulating layer 11a, for example, is formed on an aluminum base 5.

An artificial grid multi-layer film composed of a magnetic layer, e.g., CoFeNi magnetic alloy, e.g., Fe$_{18}$CO$_{10}$Ni$_{72}$ or Fe$_{16}$CO$_{20}$Ni$_{64}$ layer 3b and a conductive layer, e.g., Cu layer 3b is formed on the insulating layer 11a by use of a sputtering apparatus (not shown), for example.

The thickness of the CoFeNi magnetic alloy layer 3b is 1 nm and the thickness of the Cu layer 3a is 2.3 nm. Each of the layers 3b and 3a is composed of twenty layers laminated alternately, thereby the magnetoresistance element (GMR) 3 of the artificial grid film structure is formed.

An SiO$_2$ insulating layer 11b, for example, is formed on the GMR element 3. An Au bias pattern 6 is formed on the insulating layer 11b so as to be above the GMR element 3.

As shown in FIG. 9, an SiO$_2$ insulating layer 11c is formed on the bias pattern 6 and an artificial grid multi-layer film composed of a magnetic layer, e.g., CoFeNi magnetic alloy layer 3b and a conductive layer, e.g., Cu layer 3a is formed on the insulating layer 11c so as to b above the bias pattern 6 by use of the sputtering apparatus (not shown).

The thickness of the CoFeNi magnetic alloy layer 3b is 1 nm and the thickness of the Cu layer 3a is 2.2 nm. Each of the layers 3b and 3a is composed of twenty layers laminated alternately, thereby the magnetoresistance element (GMR) 3 of the artificial grid film structure is formed. The protecting film 12 is deposited on the GMR element 3 by photoresist or the like as shown in FIG. 9.

The artificial grid films 3a, 3b and the bias pattern 6 have patterns of predetermined sizes formed thereon by photolithography.

In FIG. 9, reference numerals 17, 19 depict conductors for supplying a voltage to the GMR elements 3, 3 and numeral 18 depicts a conductor for supplying a current to the bias pattern 6.

When a current flows to the bias pattern 6 as shown in FIG. 9, magnetic fields of the directions shown by arrows are generated around the bias pattern 6 so that bias magnetic fields Hb and −Hb of the same magnitude and which are in the opposite directions are applied to the GMR elements 3, 3 formed above and under the bias pattern 6.

Therefore, the GMR elements 3, 3 are operated at the bias points of the point b shown in FIG. 4 and the point c symmetrical to the point b, whereby the resistance values are changed with an opposite phase (i.e., phase reversed by 180 degrees) in response to the change of the external applied magnetic field as shown in FIG. 4.

A spacing between the GMR elements 3 and 3 in the upper and lower direction is less than 1 μm, which can be substantially neglected as compared with the recording wavelength of the magnetic recording medium 1.

Figure 10:
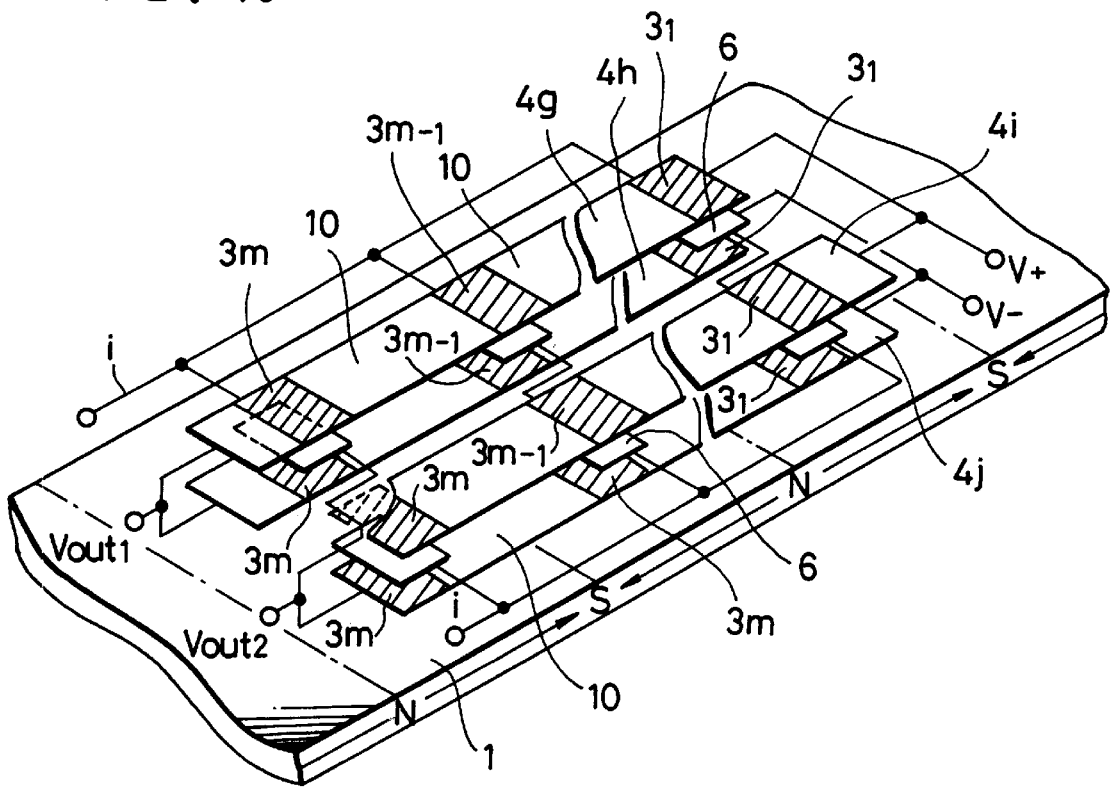
FIG. 10 is a perspective view illustrating a position detecting apparatus according to another embodiment of the present invention.

FIG. 10 shows a position detecting apparatus according to another embodiment of the present invention.

As shown in FIG. 10, the bias patterns 6 are disposed between the GMR elements $3_1, 3_2, \ldots, 3_m$ of the magnetic variable resistor 4g and the GMR element $3_1, 3_2, \ldots, 3_m$ of the magnetic variable resistor 4h so as to be laminated through the insulating layers. In parallel, the bias patterns 6 are disposed between the GMR elements $3_1, 3_2, \ldots, 3_m$ of a similar magnetic variable resistor 4i and the GMR elements $3_1, 3_2, \ldots, 3_m$ of a similar magnetic variable resistor 4j so as to be laminated through the insulating layers as shown in FIG. 9.

The GMR elements $3_1, 3_2, \ldots, 3_m$ of each of the magnetic variable resistors 4g, 4h, 4i, 4j are disposed along the longitudinal direction of the magnetic recording medium 1. Also, the GMR elements $3_1, 3_2, \ldots, 3_m$ are disposed at the pitch P=$(\lambda/2)$n (n is a natural number).

The GMR elements $3_1, 3_2, \ldots, 3_m$ of the magnetic variable resistors 4g, 4h are made the same in phase. The GMR elements $3_1, 3_2, \ldots, 3_m$ are made the same in phase. The GMR elements $3_1, 3_2, \ldots, 3_m$ of the magnetic variable resistors 4g, 4h and the GMR elements $3_1, 3_2, \ldots, 3_m$ of the magnetic variable resistors 4i, 4j are displaced from each other by $(n\pm\frac{1}{4})\lambda$ (n is a natural number) in the longitudinal direction of the magnetic recording medium 1.

A predetermined positive voltage $V_+$ is supplied to one end of the magnetic variable resistors 4g, 4i and a predetermined negative voltage $V_-$ is supplied to one end of the magnetic variable resistors 4h, 4j. The other ends of the magnetic variable resistors 4g, 4h are connected to each other. A detecting terminal $V_{out1}$ is led out from a junction between the other ends of the magnetic variable resistors 4g, 4h. The other ends of the magnetic variable resistors 4i, 4j are connected to each other. Another detection terminal $V_{out2}$ is led out from a junction between the other ends of the magnetic variable resistors 4i, 4j.

According to this embodiment, a predetermined current flows to the bias pattern 6 and the bias magnetic field Hb shown in FIG. 4 is applied to the GMR elements $3_1, 3_2, \ldots, 3_m$ of each of the magnetic variable resistors 4g, 4i, whereby the GMR elements $3_1, 3_2, \ldots, 3_m$ are operated about the bias point b. Concurrently therewith, the bias magnetic field –Hb of the same magnitude as and the opposite direction of the bias magnetic field Hb shown in FIG. 4 is applied to the GMR elements $3_1, 3_2, \ldots, 3_m$ Of each of the magnetic variable resistors 4h, 4j, whereby the GMR elements $3_1, 3_2, \ldots, 3_m$ are operated about the bias point c which is symmetrical to the bias point b.

Similarly to FIG. 5, the equivalent circuit of the magnetic detecting portion 2 is of the bridge arrangement that a series circuit of the magnetic variable resistors 4g, 4h and a series circuit of the magnetic variable resistors 4i, 4j are connected in parallel to each other and the detection terminals $V_{out1}$ and $V_{out2}$ are led out from the junction between the magnetic variable resistors 4g, 4h and the junction between the magnetic variable resistors 4i, 4j.

When the magnetic detecting portion 2 is moved relatively to the magnetic recording medium 1, the resistance values of the magnetic variable resistors 4g, 4h, 4i, 4j are changed as shown in FIGS. 6A, 6B, 6C, 6D, respectively. Phase differences of the changes of the resistance values between the magnetic variable resistors 4g, 4h and the magnetic variable resistors 4i, 4j are 180 degrees, respectively. Therefore, as shown in FIGS. 6E and 6F, detection voltage signals with the phase differences of 90 degrees are developed at the detection terminals $V_{out1}$ and $V_{out2}$. Thus, the relative moving distance between the magnetic recording medium 1 and the magnetic detecting portion 2 can be measured by the detection voltage signals.

According to this embodiment, it is to be easily understood that there can be achieved action and effects similar to those of the first embodiment. Furthermore, according to the second embodiment, since the magnetic variable resistors 4g, 4h and 4i, 4j are overlappingly disposed, the area required by the magnetic detecting portion 2 can be reduced to half of the area of the first embodiment shown in FIG. 2. Therefore, the magnetic detecting portion 2 and the track width of the magnetic recording medium 1 can be miniaturized.

Figure 11:
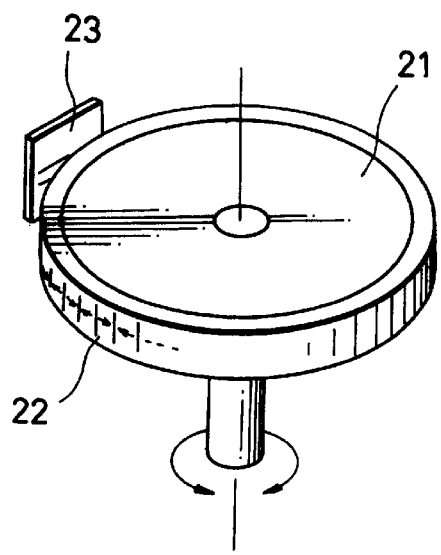
FIG. 11 is a perspective view illustrating a manner in which the position detecting apparatus according to the present invention is applied to a rotary encoder.

FIG. 11 is a perspective view illustrating a manner in which the position detecting apparatus according to the present invention is applied to a rotary encoder.

As shown in FIG. 11, a rotary encoder comprises a rotor 21, a magnetic recording medium 22 disposed at the outer peripheral portion of the rotor 21 and a magnetic detecting portion 23 composed of a detecting head, for example, opposed to the magnetic recording medium 22 disposed around the outer peripheral portion of the rotor 21. Scales are magnetically recorded on the magnetic recording medium 22 at a predetermined wavelength $\lambda$.

The magnetic detecting portion 23 is arranged as shown in FIG. 2 or 10. In this case, action and effects similar to those of FIG. 2 or 10 can be achieved. Moreover, since the magnetic variable resistors 4a to 4d or 4g to 4j can be disposed on substantially the same position of the rotor 21, it is possible to provide a rotary encoder which can generate a highly accurate detection signal.

While the magnetic variable resistors 4a, 4b, ..., 4j have been disposed on the magnetic detecting portion 2 in the same direction along the longitudinal direction of the magnetic recording medium 1 as described above, the present invention is not limited thereto and the magnetic variable resistors 4a, 4b, 4j may be disposed on the magnetic detecting portion 2 with a predetermined inclination angle θ in the longitudinal direction within the track width of the magnetic recording medium 1.

At that time, since the magnetic variable resistors 4a, 4b, ..., 4j are equally affected by the fluctuation of the magnetic recording medium 1 in the track direction, it is possible to obtain a similar highly accurate detection signal.

According to the present invention, since a plurality of, for example, m highly-sensitive magnetoresistane effect elements $3_1, 3_2, \ldots, 3_m$ with the artificial grid film structure wherein the conductive layers and the magnetic layers are alternately laminated are disposed in the relative moving direction of the magnetic recording medium at the predetermined pitch and the plurality of magnetoresistance effect elements $3_1, 3_2, \ldots, 3_m$ are connected in series to provide a single magnetic variable resistor, even when the relative angle between the single variable resistor and the magnetic recording medium is fluctuated, when the recorded state of the magnetic recording medium is partly fluctuated or even when the ambient temperature and the temperature of the magnetic variable resistor are fluctuated, this single variable resistor can be prevented from being degraded in precision because the detecting signals of the magnetoresistance effect elements $3_1, 3_2, \ldots, 3_m$ are added.

Further, since the magnetic variable resistors 4a, 4b, 4c, 4d are disposed at substantially the same position of the longitudinal direction of the magnetic recording medium in which magnetic information is recorded, even when the magnetic recording medium is mechanically fluctuated in the longitudinal direction, the magnetic recording medium 1 is curved, when characteristics are not uniform or even when a temperature distribution is fluctuated due to a heat, the four magnetic variable resistors 4a, 4b, 4c, 4d are changed in the same manner. Also, since the dimension of the four magnetic variable resistors 4a, 4b, 4c, 4d along the width direction of the magnetic recording medium 1 is as small as 95 $\mu$m in total, even when the magnetic recording medium 1 is mechanically fluctuated in the width direction, the four magnetic variable resistors 4a, 4b, 4c, 4d are changed in the same manner.

As described above, since the four magnetic variable resistors 4a, 4b, 4c, 4d are changed in the same manner when the four magnetic variable resistors 4a, 4b, 4c, 4d are mechanically fluctuated in all directions, when the magnetic recording medium 1 is curved, when the characteristics are not uniform or when the temperature is fluctuated, the output signals with the phase differences of 90 degrees can be changed in the same manner. Therefore, the position detecting apparatus according to the present invention can detect the position with high accuracy and high resolution.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A position detecting apparatus comprising:
    a magnetic recording medium on which magnetic information is recorded; and
    a magnetic detecting portion movable relative to said magnetic recording medium for detecting said magnetic information recorded on said magnetic recording medium, wherein
        said magnetic detecting portion includes a plurality of magnetic variable resistors disposed therein in parallel relation to each other and producing at least two output signals having a phase difference of 90°, each of said magnetic variable resistors having an artificial grid structure wherein conductive layers and magnetic layers are alternately laminated and each of said magnetic variable resistors further having a plurality of magnetoresistance effect elements electrically connected in series and spaced apart from one another by a predetermined pitch along a relative moving direction of said magnetic recording medium, and
        during detection of magnetic information recorded on a portion of said magnetic recording medium a direction of a current flowing through said magnetoresistance effect elements and a longitudinal direction of said magnetic information recorded on said portion of said magnetic recording medium and detected by said magnetic detecting portion are angle components that form an angle different from a right angle, wherein upon mechanical fluctuations between said magnetic recording medium and said magnetic detection portion the output signals with the phase difference of 90° are changed in a same manner as said mechanical fluctuations.

2. A position detecting apparatus according to claim 1, wherein said magnetic detecting portion includes said plurality of magnetic variable resistors disposed therein such that respective magnetoresistance effect elements of one of said plurality of magnetic variable resistors are displaced in parallel from respective magnetoresistance effect elements of another of said plurality of magnetic variable resistors by a predetermined phase difference along said relative moving direction.

3. A position detecting apparatus according to claim 1, further comprising a patterned bias element located above or below said magnetoresistance effect elements and separated therefrom by an insulating layer, wherein when a predetermined current is supplied to said patterned bias element a bias magnetic field is applied to said magnetoresistance effect elements such that a direction of said bias magnetic field is non-uniform for said magnetoresistance effect elements.

4. A position detecting apparatus according to claim 2, further comprising a bias element located above or below said magnetoresistance effect elements and separated therefrom by an insulating layer, wherein when a predetermined current is supplied to said bias element a bias magnetic field is applied to said magnetoresistance effect elements.

5. A position detecting apparatus comprising:
    a magnetic recording medium on which magnetic information is recorded; and
    magnetic detecting means movable relative to said magnetic recording medium for detecting said magnetic information recorded on said magnetic recording medium; wherein
        said magnetic detecting means includes an artificial grid film structure in which conductive layers and magnetic layers are alternately laminated, a first plurality of magnetoresistance effect elements connected in series, a first insulating layer, a bias element, a second insulating layer, and a second plurality of magnetoresistance effect elements connected in series are sequentially disposed, wherein said first and second plurality of magnetoresistance effect elements produce respective output signals having a phase difference of 90°,
        when a predetermined current is supplied to said bias element a bias magnetic field is produced such that said bias magnetic field is applied to said first plurality of magnetoresistance effect elements in a first direction and said bias magnetic field is applied to said second plurality of magnetoresistance effect elements in a second direction opposite to said first direction, and
        during detection of magnetic information recorded on a portion of said magnetic recording medium a direction of a current flowing through said magnetic detecting means and a longitudinal direction of said magnetic information recorded on said portion of said magnetic recording medium and detected by said magnetic detecting means are angle components that form an angle different from a right angle, wherein upon mechanical fluctuations between said magnetic recording medium and said magnetic detecting means the output signals with the phase difference of 90° are changed in a same manner as said mechanical fluctuations.

6. A position detecting apparatus according to claim 1, wherein said magnetic detecting portion includes a first magnetoresistance effect element, a first insulating layer, a bias element, a second insulating layer, and a second magnetoresistance effect element sequentially disposed such that when a predetermined current is supplied to said bias element a bias magnetic field is produced such that said bias magnetic field is applied in a first direction to said first magnetoresistance effect element and in an opposite direction to said second magnetoresistance effect element.

7. A position detecting apparatus according to claim 2, wherein said magnetic detecting portion includes a first magnetoresistance effect element, a first insulating layer, a bias element, a second insulating layer, and a second magnetoresistance effect element sequentially disposed such that when a predetermined current is supplied to said bias element a bias magnetic field is produced such that said bias magnetic field is applied in a first direction to said first magnetoresistance effect element and in an opposite direction to said second magnetoresistance effect element.

8. A position detecting apparatus according to claim 3, wherein said magnetic detecting portion includes a first magnetoresistance effect element, a first insulating layer, a bias element, a second insulating layer, and a second magnetoresistance effect element sequentially disposed such that when a predetermined current is supplied to said bias element a bias magnetic field is produced such that said bias magnetic field is applied in a first direction to said first magnetoresistance effect element and in an opposite direction to said second magnetoresistance effect element.

9. A position detecting apparatus comprising:

a magnetic recording medium on which magnetic information is recorded; and a magnetic detecting portion movable relative to said magnetic recording medium for detecting said magnetic information recorded on said magnetic recording medium; wherein said magnetic detecting portion includes a plurality of magnetic variable resistors disposed therein in parallel relation to each other and producing at least two output signals having a mutual phase difference of 90°, each of said magnetic variable resistors having an artificial grid structure wherein conductive layers and magnetic layers are alternately laminated and each of said magnetic variable resistors further having a plurality of magnetoresistance effect elements connected in series and spaced apart from one another by a predetermined pitch along a relative moving direction of said magnetic recording medium; and during detection of magnetic information recorded on a portion of said magnetic recording medium a direction of a current flowing through said magnetoresistance effect elements is parallel to a longitudinal direction of said magnetic information recorded on said portion of said magnetic recording medium and detected by said magnetic detecting portion, wherein upon mechanical fluctuations between said magnetic recording medium and said magnetic detecting portion the output signals with the phase difference of 90° are changed in the same manner as said mechanical fluctuations.

* * * * *